United States Patent
Stolyar et al.

(10) Patent No.: US 8,411,624 B2
(45) Date of Patent: Apr. 2, 2013

(54) METHOD OF DYNAMIC RESOURCE ALLOCATIONS IN WIRELESS SYSTEMS

(75) Inventors: Aleksandr Stolyar, Basking Ridge, NJ (US); Harish Viswanathan, Morristown, NJ (US)

(73) Assignee: Alcatel Lucent, Paris (FR)

( * ) Notice: Subject to any disclaimer, the term of this patent is extended or adjusted under 35 U.S.C. 154(b) by 914 days.

(21) Appl. No.: 12/459,435

(22) Filed: Jul. 1, 2009

(65) Prior Publication Data

US 2010/0034157 A1 Feb. 11, 2010

Related U.S. Application Data

(63) Continuation-in-part of application No. 11/770,315, filed on Jun. 28, 2007, now Pat. No. 8,295,231.

(60) Provisional application No. 61/196,857, filed on Oct. 21, 2008.

(51) Int. Cl.
H04W 4/00 (2009.01)
H04B 7/00 (2006.01)
H04W 40/00 (2009.01)
H04W 72/00 (2009.01)

(52) U.S. Cl. .................... 370/329; 370/310.2; 370/330; 455/447; 455/450; 455/452.1

(58) Field of Classification Search .................. 370/329
See application file for complete search history.

(56) References Cited

U.S. PATENT DOCUMENTS

| 7,535,869 B2 * | 5/2009 | Yoon et al. ..................... 370/329 |
| 2004/0072571 A1 * | 4/2004 | Halonen et al. ............... 455/450 |

* cited by examiner

Primary Examiner — Huy C Ho
(74) Attorney, Agent, or Firm — Wolff & Samson PC

(57) ABSTRACT

A method of dynamic resource allocations in wireless network is disclosed. The method provides that a base station in the network allocates resources to users independently of other base stations and without resource planning. Resource allocations are done based at least in part on a local optimization objective and a channel quality indicator from one or more users, and result in efficient resource reuse.

4 Claims, 7 Drawing Sheets

METHOD OF DYNAMIC RESOURCE ALLOCATIONS IN WIRELESS SYSTEMS

RELATED APPLICATION

This application is a continuation in part of U.S. patent application Ser. No. 11/770,315, filed Jun. 28, 2007, published Jan. 1, 2009 as US Published Application No. 2009/0003266 now U.S. Pat. No. 8,295,231, the subject matter thereof being fully incorporated herein by reference. This application further claims priority pursuant to 35 U.S.C. Sec 119(e) to U.S. Provisional Application No. 61/196,857, filed Oct. 21, 2008, entitled "Self-Organizing Dynamic Fractional Frequency Reuse Through Distributed Inter-Cell Coordination: The Case of Best-Effort Traffic," the subject matter thereof being fully incorporated herein by reference.

FIELD OF THE INVENTION

The present invention generally relates to a method of dynamic resource allocations in wireless systems.

BACKGROUND OF THE INVENTION

In wireless communications, users situated relatively far from a base station that serves them are generally more susceptible to interference from neighboring base stations and to signal attenuation. As a consequence, such users may experience relatively low signal-to-interference-and-noise ratios (SINRs). The relatively distant users are referred to as "cell edge users" or as users with "poor geometry." It will be understood that when one user is said to be more "distant" from the base station than another, what is meant does not depend solely on geographical distance, but also to susceptibility to other factors leading to attenuation and interference.

Several techniques with different degrees of complexity can be considered for out-of-cell interference mitigation in orthogonal frequency division multiple access (OFDMA) systems. Most of these schemes involve transmitting in any given cell over a portion of the spectrum that is smaller than the entire available bandwidth while neighboring cells employ a different portion of the spectrum. The primary goal of many of these techniques is to enhance the cell edge users' spectral efficiency and throughput at the expense of average sector throughput, or in some cases, with improved sector throughput as well. The interference mitigation schemes differ primarily in how the bandwidth occupied and transmitted power in a given sector are determined, and whether it is adapted as a function of the users being served, and whether it is coordinated across different cells.

For example, some schemes involve coordinated scheduling across multiple cells, in which bandwidth allocations are jointly determined across the cells on a per scheduling interval basis. Such schemes typically involve significant signaling between base stations, thus making them difficult to implement. Other schemes are based on static frequency partitioning or distributed coordination that do not involve signaling between base stations.

In an OFDMA system the transmission band is divided into a number of sub-carriers and information is transmitted by modulating each of the sub-carriers. Furthermore, time is divided into slots consisting of a number of OFDM symbols and transmissions are scheduled to users by assigning frequency resources (e.g., a set of logical sub-carriers) on specific slots. The logical sub-carriers are mapped to physical sub-carriers for transmission. The mapping can change from time to time and is referred to as frequency hopping. Frequency hopping is done to achieve interference averaging.

In OFDMA systems that support fractional frequency reuse (FFR) for interference mitigation, frequency and time resources (within an interlace period or frame that repeats periodically) are divided into several resource sets. Frequency hopping of sub-carriers is restricted to be within the sub-carriers of a resource set so that users scheduled on a certain resource set experience interference only from users scheduled in neighboring sectors in the same resource set. Each resource set is typically reserved for a certain reuse factor and is associated with a particular transmission power profile. For example, resource set 1 may be reserved for good geometry users in all sectors and resource set 2, 3, 4 for bad geometry users in sectors 1, 2, 3, respectively, in each cell resulting in ⅓ reuse for bad geometry users and universal reuse for good geometry users. Thus, fractional frequency reuse is achieved.

Fixed fractional frequency reuse does not adapt to traffic dynamics in the sense that the frequency reuse achieved is not adjusted based on interference conditions experienced by the users. Instead of a fixed partition of the available bandwidth leading fixed frequency reuse, it is possible to achieve dynamic frequency reuse through prioritized use of sub-carriers in the adjacent sectors. Interference avoidance is achieved by assigning different priority orders in the neighboring sectors so that when transmitting to cell edge users using sub-channelization, the neighboring interfering sectors transmit on different sub-carriers. Such a scheme was described in Das et al., "Interference mitigation through intelligent scheduling", Proc. Asilomar Conference on Signals and Systems, Asilomar, Calif., November 2006. For such an approach it is necessary to do frequency planning to determine the priorities and also dynamically adjust the thresholds under which users are assigned to different resource sets.

It is known that reuse patterns, such as the 1:3 reuse pattern of FIG. 1, are useful for reducing interference between neighboring sectors. As seen in FIG. 1, each cell (e.g., shown as hexagonal units 102, 104, 106) of a network is divided, according to a 1:3 reuse pattern, into respective α, β, and γ sectors. The three classes of sectors are geographically distributed in such a way that, ideally, two sectors of the same class (e.g., characterized by the same subcarrier frequency) do not share a common edge. As a consequence, interference can be reduced by assigning mutually disjoint sets of subcarriers to the respective sector classes. In such a situation, the three sector classes may be said to be "mutually orthogonal" with respect to their use of subcarriers. In the figure, the respective sets of sub-bands, each of which contains sets of subcarriers, are denoted as $f_1$, $f_2$, and $f_3$.

SUMMARY OF INVENTION

One embodiment of the present invention provides a method of dynamic allocation of resources in a wireless network with a number of base stations each associated with a number of reception areas, the method includes: each base station adaptively allocating resources to one or more users in each associated reception area based at least in part on one local optimization objective for each associated reception area and a channel quality indicator from the one or more users, the allocation of resources being done independently of other base stations, and interference is minimized between neighboring reception area through automatic resource reuse across the number of reception areas without resource planning prior to allocating the resources by each base station.

Another embodiment provides a method of dynamic allocation of resources in a wireless network with a number of base stations each having respective associated reception areas, the method includes: a base station adaptively allocating resources to one or more users in at least one associated reception area based at least in part on one local optimization objective and a channel quality indicator from the one or more users, the allocation of resources being done independently of other base stations, in which interference is minimized between neighboring reception areas through automatic resource reuse in the at least one associated reception area without resource planning prior to allocating the resources by the base station.

BRIEF DESCRIPTION OF THE FIGURES

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
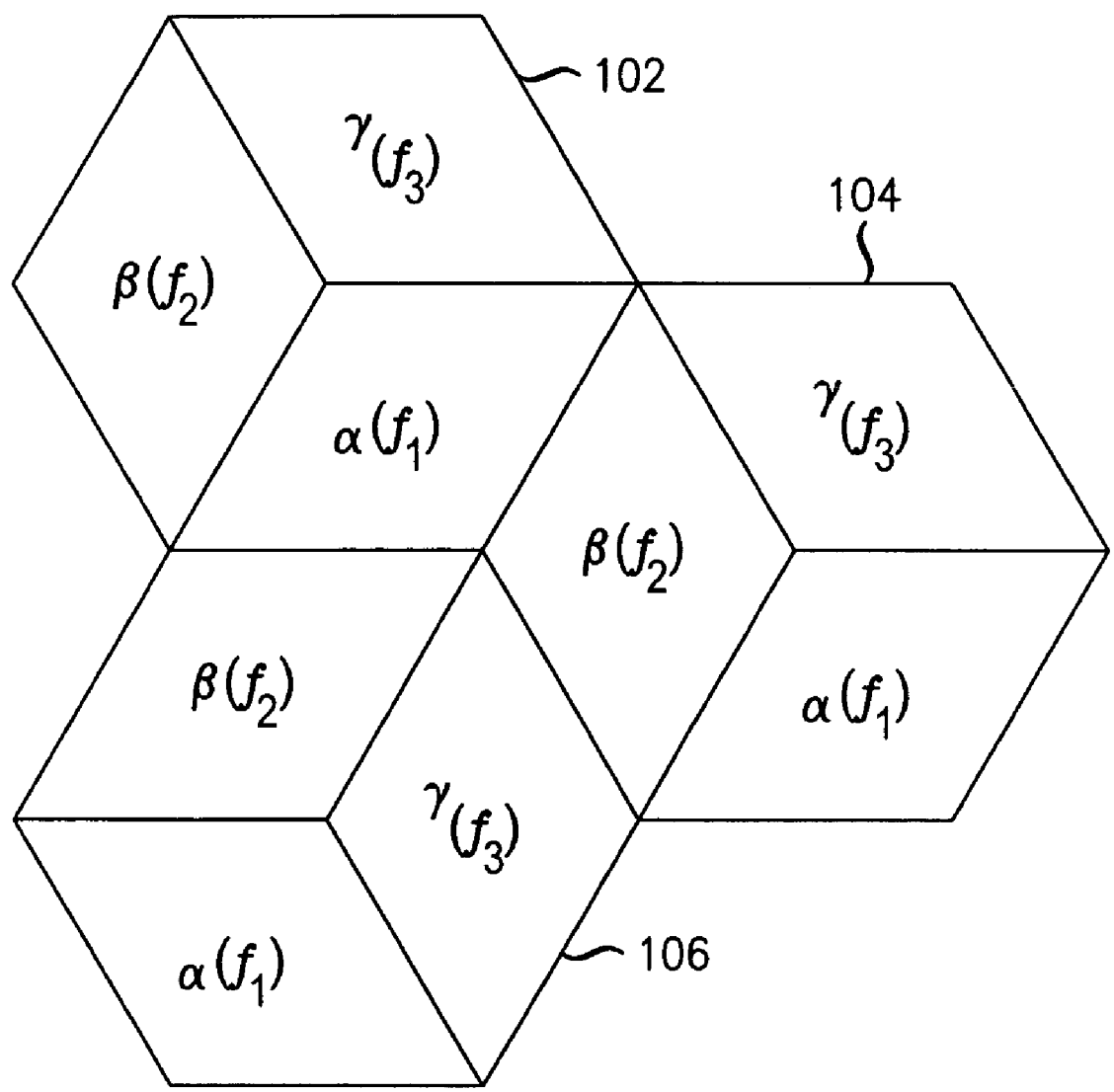
FIG. 1 is a schematic illustration of a fractional frequency reuse pattern.

The present invention provides a method for dynamic resource allocation to implement resource reuse, including fractional frequency reuse (FFR) and timeslot reuse, in wireless systems for maximizing system capacity and/or coverage. Specifically, each base station servicing its associated cell or sectors makes allocation decisions independently, i.e., without coordination with other base stations, or direct information of how band assignments are done in other base stations. The algorithm used for resource allocation is adaptive, e.g., resource allocation is done based in part on feedback received from mobile units or users, allowing for dynamic resource reuse such as frequency and timeslot reuse. Although frequency reuse may be used as examples in the following discussions, it is understood that the embodiments of the invention also apply generally to resource reuse.

Those skilled in the art will understand that a base station may serve a cell of a wireless network as a single, integral geographical unit, or the cell may be subdivided into sectors which are served independently of one another. The term "reception area" will be used to denote the smallest independent geographical unit served by a base station. Thus, depending on the specific circumstances, a reception area may be a cell, or it may be a sector or other geographical unit. In the following discussion, cells will be referred to in some places, and sectors in others. Such terminology should not be understood as limiting, because the principles to be described below may be applied irrespective of whether the pertinent reception area is a cell, a sector, or some other geographical unit.

Those skilled in the art will understand further that various formats for wireless communication include a relatively long time window which is subdivided into shorter time windows during each of which, for example, one user is served. Without limitation, the term "frame" will be adopted herein to denominate such a longer time window, and the term "slot" or "timeslot" to denominate the shorter time window. In particular, as used herein, the term "timeslot" encompasses "sub-frames" as a specific example.

It is further understood that resource planning, as used herein, includes frequency and timeslot planning performed offline (i.e., not real-time), and that "planning" also includes offline assignment of priorities for using different resources in different sectors, cells or reception areas in general. Although discussions of various examples may refer to frequency reuse or planning, it is understood that the methods and algorithms of the present invention also apply generally to resource allocations and reuse.

According to embodiments of the invention, each base station of a cell (sector or reception area) allocates its mobile units or users to the frequency bands based, at least in part, on a local optimization objective and a channel quality indicator, e.g., the level of interference the mobile unit receives in each of the bands. Examples of an optimization objective may include a minimization of the total power usage, minimization of the total weighted power usage (where power in one band may weigh more than in the other), a linear combination of power and frequency bandwidth, and so on.

Although examples below may be discussed with respect to resource allocations at the sector level, e.g., taking into account only local optimization objectives and constraints within each sector, embodiments of the invention can also be extended and applied to resource allocations at the cell level, e.g., by taking into account transmissions in other sectors of a cell being serviced by a specific base station.

The band allocation algorithm (or more generally, resource allocation algorithm), of a given base station is oblivious to, or independent of, how allocation is done by other base stations. Unlike conventional band assignment approaches, no explicit resource planning, e.g., frequency and/or timeslot planning, e.g., a priori band assignment performed offline or separately from the algorithm is needed.

However, the cells' optimization objectives and/or their parameters such as weighting factors can be set up in such a way that the resulting system-wide allocation of mobile units to the bands follows a very efficient FFR for improved performance, without the use of frequency planning. In other words, an efficient FFR happens "automatically", as a result of the implementation of the method of the present invention, without frequency assignments being done in advance. Furthermore, the FFR "induced" by the algorithm adapts, also "automatically", to the changing cell layout and/or mobile unit distribution and service requirements. Thus, interference between neighboring reception areas are minimized through automatic resource reuse across a number of reception areas.

Illustrative embodiments are discussed in the context of sub-carrier and power allocation in downlink of cellular systems based on orthogonal frequency division mulitple access (OFDMA) that achieve out-of-cell or out-of-sector interference avoidance through dynamic fractional frequency reuse, and algorithms are provided for both constant bit rate traffic such as Voice over Internet Protocol (VoIP) and variable bit rate best effort traffic such as web browsing. The algorithms are adaptive and adjust the resource allocation to time varying channel conditions and traffic patterns to maximize performance. Unlike conventional approaches, these algorithms do not require any a priori frequency planning for achieving fractional reuse, although frequency planning may be used to enhance performance.

Although embodiments of the present invention are discussed for OFDMA systems, they are generally applicable to multichannel code division multiple access (CDMA) systems and other multichannel wireless systems.

In one embodiment, a "shadow scheduling" algorithm is used by a base station to optimize a local objective in real time, in a computationally efficient manner. The shadow scheduling algorithm has been mathematically proven to indeed optimize the local objective.

For illustrative purpose, an OFDMA system with J sub-bands is used in this example. (Sub-bands are logical. Physically, a sub-band is an arbitrary fixed subset of sub-carriers, possibly from across the entire band.) For simplicity, a resource set is considered to consist only of frequency domain sub-bands defined in all timeslots. However, the algorithms described below can readily be extended to more general resource sets. Furthermore, in this example, all sub-bands are assumed to have the same number of sub-carriers, referred to as capacity c. In general, however, the sub-bands may have different number of sub-carriers.

Embodiments of the present invention provide algorithms suitable for use with both constant bit rate (CBR) traffic and best effort (BE) traffic, as discussed below.

As used herein, a constant bit rate (CBR) type traffic flow refers to a data flow in which, in general, a certain amount of data needs to be delivered to a mobile user at regular, typically fixed length, time intervals, and typically with the specified, low delay requirement. It is also possible to allow for some variations in the amount of data within each interval and/or variations in the interval duration. A voice-over-IP (VoIP) is a standard example of a CBR data flow.

A best effort (BE) type traffic flow refers to a data flow in which, in general, the system has freedom to choose the amount of data delivered to the user, typically with non-strict, or even non-existent, delay requirements. The system objective with respect to BE users is to allocate resources to them in a fair fashion. A typical example of a BE flow is a large file download. Some BE flows, however, may have explicit or implicit average rate requirements, over relatively large time intervals (of the order of 1 second or more). A typical example is an audio/video stream.

Algorithm for CBR Traffic

In the algorithm for use with CBR traffic, for each sub-band j, there is a parameter $a_j \geq 0$, which is the "unit cost of power" for the power used on this sub-band. The default values may be $a_j=1$. (For the purposes of "inducing" fractional frequency reuse (FFR), power usage on some carriers may be made more expensive, e.g., by setting $a_j>1$.)

Let I denote the number of CBR-type traffic flows, which may, for example, be VoIP. The set of these flows is in fact not constant, and instead, varies with time. But the set changes relatively slowly. Assume also that each activity period ("talk spurt") is a separate flow. Let $m_{ij}$ denote the number of sub-carriers that flow i needs to be allocated if it is assigned to sub-band j. Also, let $p_{ij}$ denote a "medium-term" (e.g., over the order of 1 second intervals) average transmit power that will need to be allocated to flow i, if flow i is assigned to sub-band j.

Both $m_{ij}$ and $p_{ij}$ are estimated based on feedback received from users within a sector—or more generally, a reception area, at certain predetermined intervals, e.g., one skilled in the art will know how $m_{ij}$ and $p_{ij}$ can be computed from one or more channel quality indicators (CQI), such as signal-to-interference-and-noise (SINR) ratio that captures the effect of interference, from users' feedback. Since both $m_{ij}$ and $p_{ij}$ are determined by a medium-term (e.g., about 1 second intervals) average channel quality received for each resource set, they change relatively slowly and there is no need for frequent channel quality information feedback. In addition, $m_{ij}$ and $p_{ij}$ are typically highly correlated, since they both depend on the channel quality (although this feature is not required for the algorithm described below).

For the purpose of this discussion, CBR-type flows, with tight delay requirements, are given absolute priority over other traffic types. Their assignment to the sub-bands has an objective of minimizing the total cost of power. (If all $a_j=1$, the objective is to minimize total power usage. In this case, if $m_{ij}$ and $p_{ij}$ indeed have strongly positive correlation, the total sub-carrier usage is also reduced as well.) The constraints are the sub-band capacities c and the total available power p* on all sub-bands. Formally, if A(j) is the set of flows assigned to sub-band j, the desired assignment A=(A(j)) seeks to minimize the term shown in Eq. (1) below, subject to the two constraints shown in Eq. (2) and (3):

$$\min_{\{A(j)\}} \sum_j \sum_{i \in A(j)} a_j p_{ij} \qquad \text{Eq. (1)}$$

subject to the following conditions:

$$\sum_j \sum_{i \in A(j)} p_{ij} \leq P_{tot} \qquad \text{Eq. (2)}$$

$$\sum_{i \in A(j)} m_{ij} \leq N_j \qquad \text{Eq. (3)}$$

The optimization problem can be understood as trying to minimize power and subcarrier usage, and leave as much resource as possible to other traffic types. An additional, implicit objective is to "shift" power used by the sector to its "cheaper" sub-bands, and thus minimize the interference this sector creates on its more "expensive" sub-bands. Thus, the sub-band(s) that are typically assigned to bad geometry users in the sector are provided at a lower cost, while sub-bands that will typically be used by bad geometry users in interfering neighboring sectors are provided at a higher cost. This can be thought of as trying to create a soft frequency reuse pattern, which induces a good system-wide FFR.

Note that while the optimization objective Eq. (1) is a reasonable one, it is certainly not the only reasonable, "individual" sector objective to induce an efficient system-wide FFR. For example, one may try to explicitly include sub-carrier usage into the objective. It is contemplated that other objectives may also be acceptable.

In addition, in assigning users to sub-bands, the algorithm may also incorporate one or more of the following features, e.g., avoiding frequent reassignment of CBR-type flows (to reduce the downlink signaling overhead), or providing a simple way to adapt automatically to an "evolving" set of users and their "evolving" service requirements $m_{ij}$ and $p_{ij}$.

Figure 2:
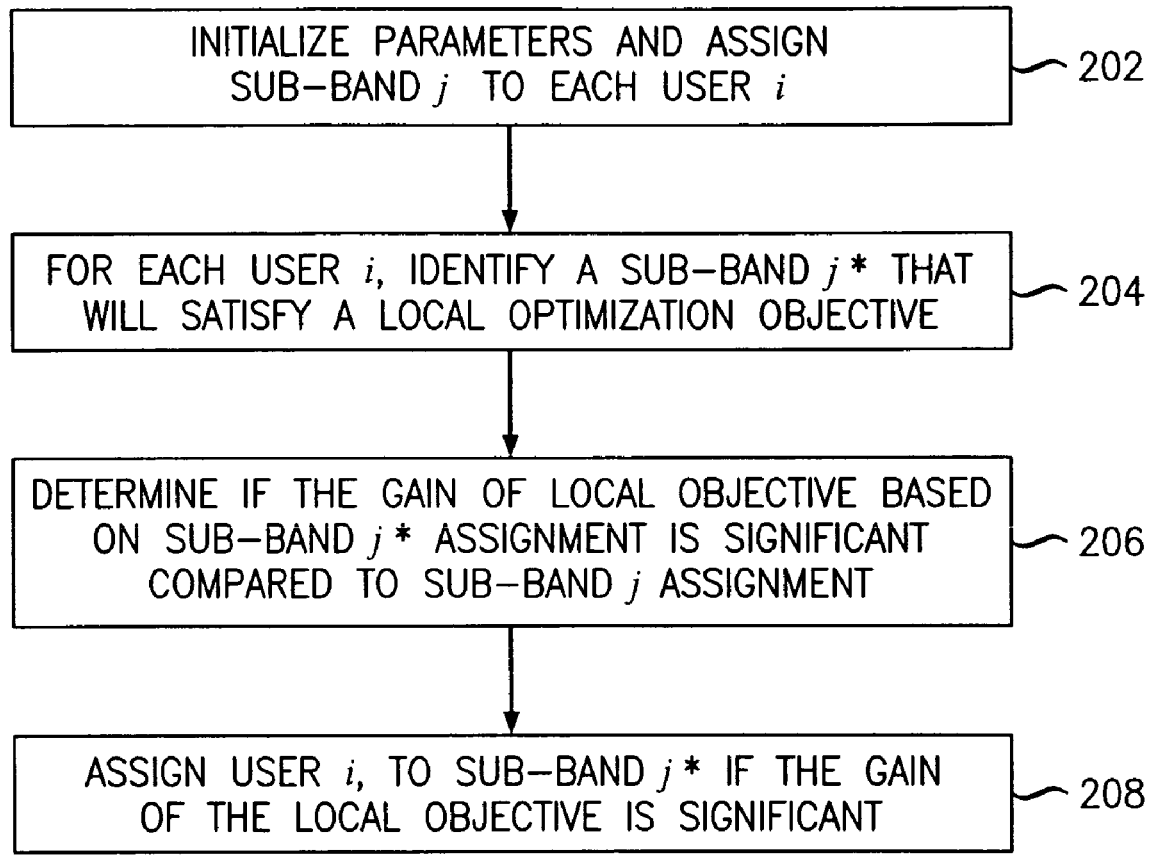
FIG. 2 is a schematic illustration of a method for allocating resources for constant bit rate traffic flow.

FIG. 2 illustrates schematically a method of assigning sub-bands to users or CBR traffic flows. It is understood that assigning a "sub-band" to a user or flow means that a set of sub-carriers in that sub-band is assigned to that user or flow, but not the entire sub-band itself. The method 200 begins in step 202 by assigning a sub-band, j, to each user or traffic flow i, while initializing two parameters used for keeping track of two constraints: a power constraint and the number of sub-carriers required for flow i, if flow i is assigned to carrier j. In step 204, in each time interval selected for band assignment update (e.g., may be a time slot), for a given flow i, identify a sub-band j* that will satisfy a local optimization objective. In this example, the objective is one of minimizing a term that is indicative of power and subcarrier usage for flow i.

After j* has been identified, a determination is made as to whether the minimized power and subcarrier usage provides a significant gain compared to the power and subcarrier usage under the initial sub-band assignment, as shown in step 206. If the gain satisfies a predetermined criterion, e.g., if the power and subcarrier usage savings exceeds a predetermined threshold, then sub-band j* can be assigned to flow i. Otherwise, flow i retains its initial sub-band j. This sub-band assignment based on the local optimization objective is done for all users or traffic flows at each suitable time interval.

If the integrality constraints in Eq. (1)-Eq. (3) are relaxed, which is reasonable if one assumes that $m_{ij}$ is typically much smaller than c, then Eq. (1)-Eq. (3) is a linear program and the following simple "shadow scheduling" algorithm provably solves it, as shown by Stolyar, "Maximizing Queuing Network Utility subject to Staility: Greedy Primal-Dual Algorithm" in Queueing Systems, vol. 50, pp. 401-457 (2005).

Figure 3:
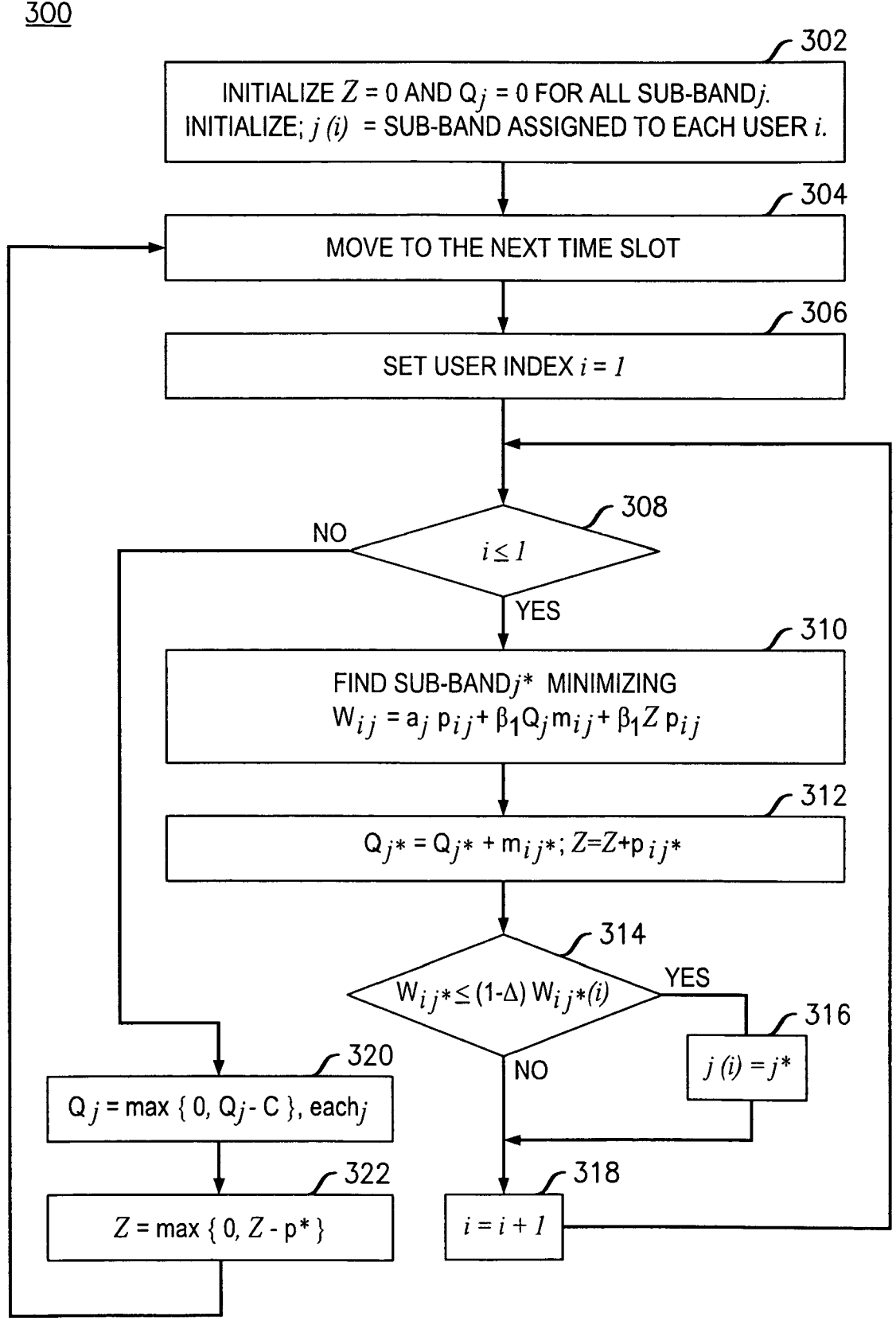
FIG. 3 is a flow chart illustrating one embodiment of an algorithm for use with constant bit rate traffic.

FIG. 3 shows a flow chart of an algorithm for implementing the method 200. In the shadow algorithm 300, initialization of two parameters Z, $Q_j$ and initial assignment of sub-bands are performed in block 302. Z represents a virtual ("ficticious") queue that keeps track of the total power constraint of Eq. (2), while $Q_j$ represents a virtual queue for each sub-band j to keep track of the constraint Eq. (3). A small parameter, $\beta_1 > 0$ is also provided for controlling a tradeoff between responsiveness of the algorithm and its accuracy. In one embodiment, $\beta_1$ is equal to 0.01. For example, the initial state can be: $\beta_1 Q_j = 1$ for all j and Z=0. Although a good choice of initial state is important, it is not crucial.

In block 304, the time slot for sub-band allocation is advanced to the next slot, and a first user (or traffic flow) is selected by setting the user index i to 1, as shown in block 306. In block 308, a comparison is made as to whether the flow index i is less than or equal to the total number of flows I.

If the answer is "yes", then the method proceeds to block 310, which identifies a sub-band j, belonging to a resource set B(i) assigned to user i, that would minimize a term $W_{ij}$. $W_{ij}$ is indicative of a power and subcarrier usage, and in this example, is given by:

$$W_{ij} = a_j p_{ij} + \beta_1 Q_j m_{ij} + \beta_1 Z p_{ij} \quad \text{Eq. (4)}$$

In Eq. (4), the first term $a_j p_{ij}$ represents a cost of power, the second term is indicative of the sub-band capacity constraint, and the third term is indicative of the total power constraint. In another embodiment, in particular in the case when all parameters $a_j$ are equal, the third term is omitted from $W_{ij}$, so that the minimization in block 310 is done only for the sum of the first two terms. In one embodiment, $a_j$ is equal to 1 for all j, and $\beta_1$ is equal to 0.01.

In block 312, parameters $Q_{j*}$ and Z are updated according to: $Q_j = Q_j + m_{ij}$ and $Z = Z + p_{ij}$. This can be interpreted as "routing" one unit of flow i traffic to queue j, and consuming amount $p_{ij}$ of power.

In decision block 314, a query is performed to evaluate the gain resulting from the sub-band j* assignment. Specifically, the term, $W_{ij*}$ for the j* sub-band, is compared with $W_{ij}$ for the initial sub-band j according to the equation: $W_{ij*} \leq (1-\Delta) W_{ij}$ (i) shown in block 314, with a predetermined parameter $\Delta$ being used in this comparison step. If the answer is "yes", e.g.,
the gain is considered sufficient to justify a sub-carrier re-assignment, then flow i is re-assigned to sub-band j*, as shown in block 316. Otherwise, flow i retains its existing sub-band j.

By providing a "gain threshold" as a criterion, one can avoid frequent re-assignments of sub-bands. That is, flow i is re-assigned from its current sub-band $j \notin B(i)$ to another sub-band $k \in B(i)$ only if the gain satisfies the criterion determined by:

$$a_k p_{ik} + \beta_1 Q_k m_{ik} + \beta_1 Z p_{ik} < (1-\Delta)(a_j p_{ij} + \beta_1 Q_j m_{ij} + \beta_1 Z p_{ij})$$

The assessment as to whether to re-assign a sub-band can be done by obtaining a difference or a ratio between the term $W_{ij*}$ (with a re-assigned sub-band j*) versus the term $W_{ij}$ (with the current sub-band j), and comparing the difference or ratio to a predetermined threshold value.

In block 318, the flow index i is increased by one for the next user or flow. The process is repeated starting from blocks 308 for all traffic flows i.

After all flows i have been processed for sub-band assignment, as determined by a "no" answer in block 308, parameters $Q_j$ and Z are set to appropriate values as shown in blocks 320 and 322, respectively. In block 320, for each j, $Q_j$ is updated by: $Q_j = \max\{Q_j - c, 0\}$, i.e., $Q_j$ is set to the larger of either $Q_j - c$, or 0. In block 322, Z is updated by $Z = \{Z - p, 0\}$. The entire process then repeats for the subsequent time slot, as shown in block 304.

The above algorithm provides a simple and robust way of performing sub-band assignments. For example, if the initial estimates of $m_{ij}$ and $p_{ij}$ are reasonable, then even the initial assignment of a flow i would be reasonable. If, however, the "new" flow is in fact a new talk spurt of an existing "session", the last estimated values of $m_{ij}$ and $p_{ij}$ can be used as new estimates. Even if a bad initial assignment has been made, it can be improved by subsequent reassignments as estimates of $m_{ij}$ and $p_{ij}$ get better. Moreover, even though the algorithm solves the problem Eq. (1)-Eq. (3) assuming set of flows and all $m_{ij}$ and $p_{ij}$ are constant, it is robust with respect to $m_{ij}$ and $p_{ij}$ changing with time, if such changes are relatively slow. Thus, the algorithm "tracks" the optimal solution of Eq. (1)-Eq. (3) as $m_{ij}$ and $p_{ij}$ change, by doing simple updates of variables in each step.

In this example, the optimization objective and constraints are considered for resource allocations at the sector level. However, in general, the $m_{ij}$ and $p_{ij}$ can also be estimated at the cell level by taking into account transmissions in other sectors of a cell.

Furthermore, the algorithm induces "good" FFR, namely, low-geometry flows in neighboring interfering sectors will avoid interference from each other by moving to different sub-bands. High geometry users in neighboring sectors will be able to share same sub-bands. This happens automatically through implementation of the algorithm, i.e., without any frequency planning, and results in aggregate system capacity improvement.

Figure 4B:
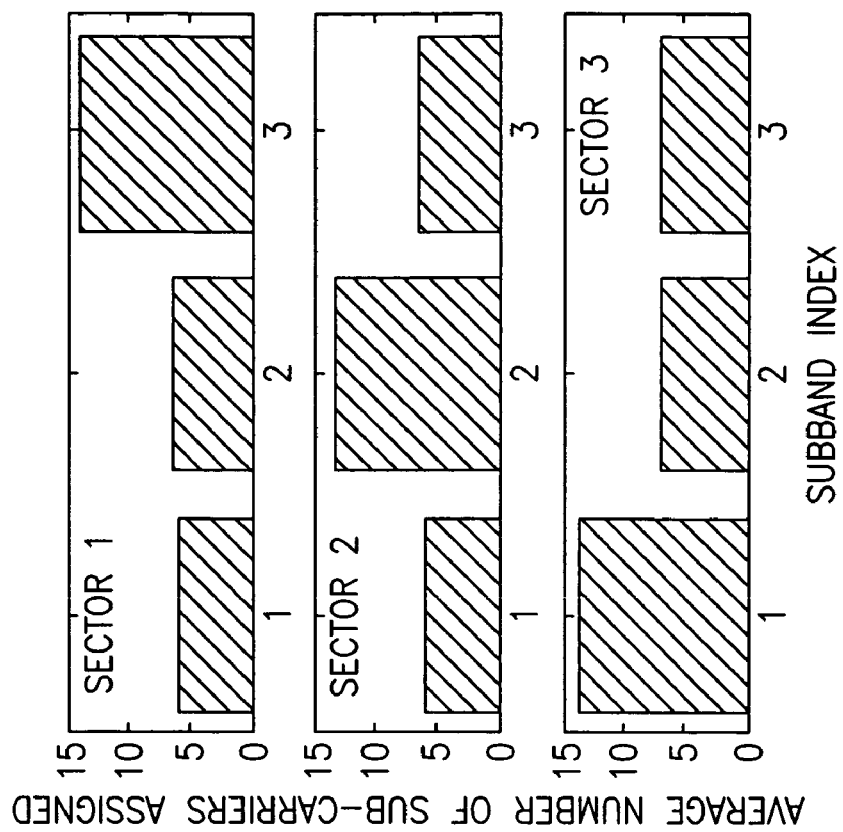
FIGS. 4A-B are results for a three-sector simulation using the algorithm for constant bit rate traffic.
Figure 4A:
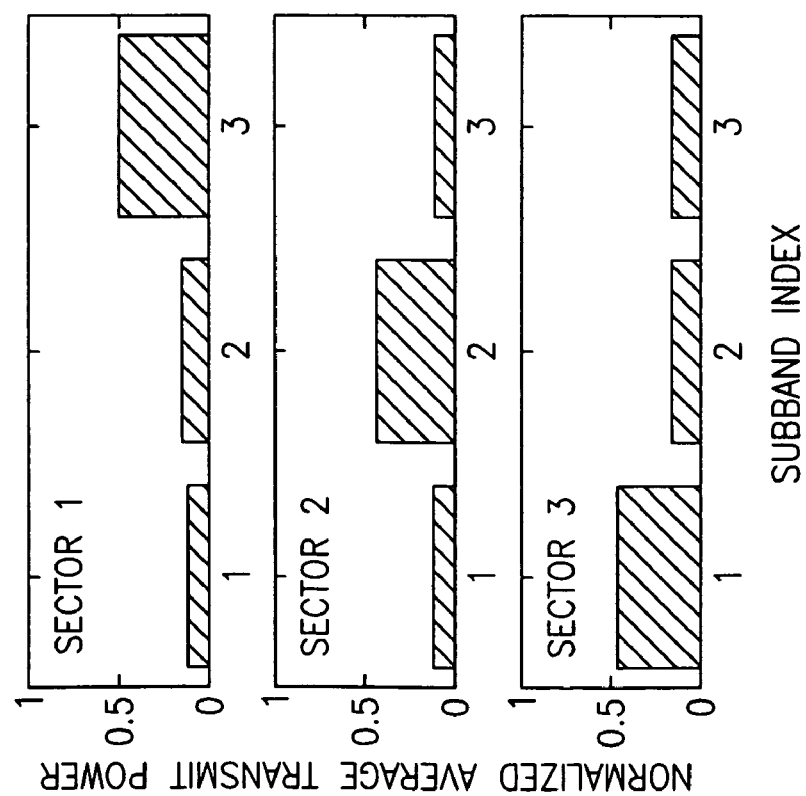

FIGS. 4A-B illustrate results for a simulation involving three sectors and three sub-bands using the algorithm of FIG. 3. FIG. 4A shows a plot of the average transmit power versus the sub-band index (j=1, 2 and 3) for each of the three sectors, indicating clearly the resulting FFR pattern, which is automatically induced by the resource allocation method of the present invention. FIG. 4B shows a plot of the number of sub-carriers assigned versus the sub-band index (j=1, 2 and 3) for each of the three sectors, also indicating that an efficient FFR pattern is automatically induced.

Algorithms for Best Effort Traffic Flows

For Best Effort traffic type, a different method is used. One embodiment involves a two-part process, which can be implemented using two algorithms run by each sector (or more generally, run by each reception area). The first algorithm is referred to as a shadow algorithm, which determines a good power allocation and constantly updates the power allocation $p_j$ (where j=1, ..., J) to each of the sub-bands j, subject to the total power constraint $\Sigma_j p_j \leq p^*$. The second algorithm is referred to as the actual scheduling algorithm, which assigns each sub-band according to the power allocation provided by the shadow algorithm, and determines which user is scheduled in each sub-band in each time-slot.

Although the example below illustrates resource allocations based on local optimization at the sector level, it can also be extended to resource allocations and optimization at the cell level.

Figure 5:
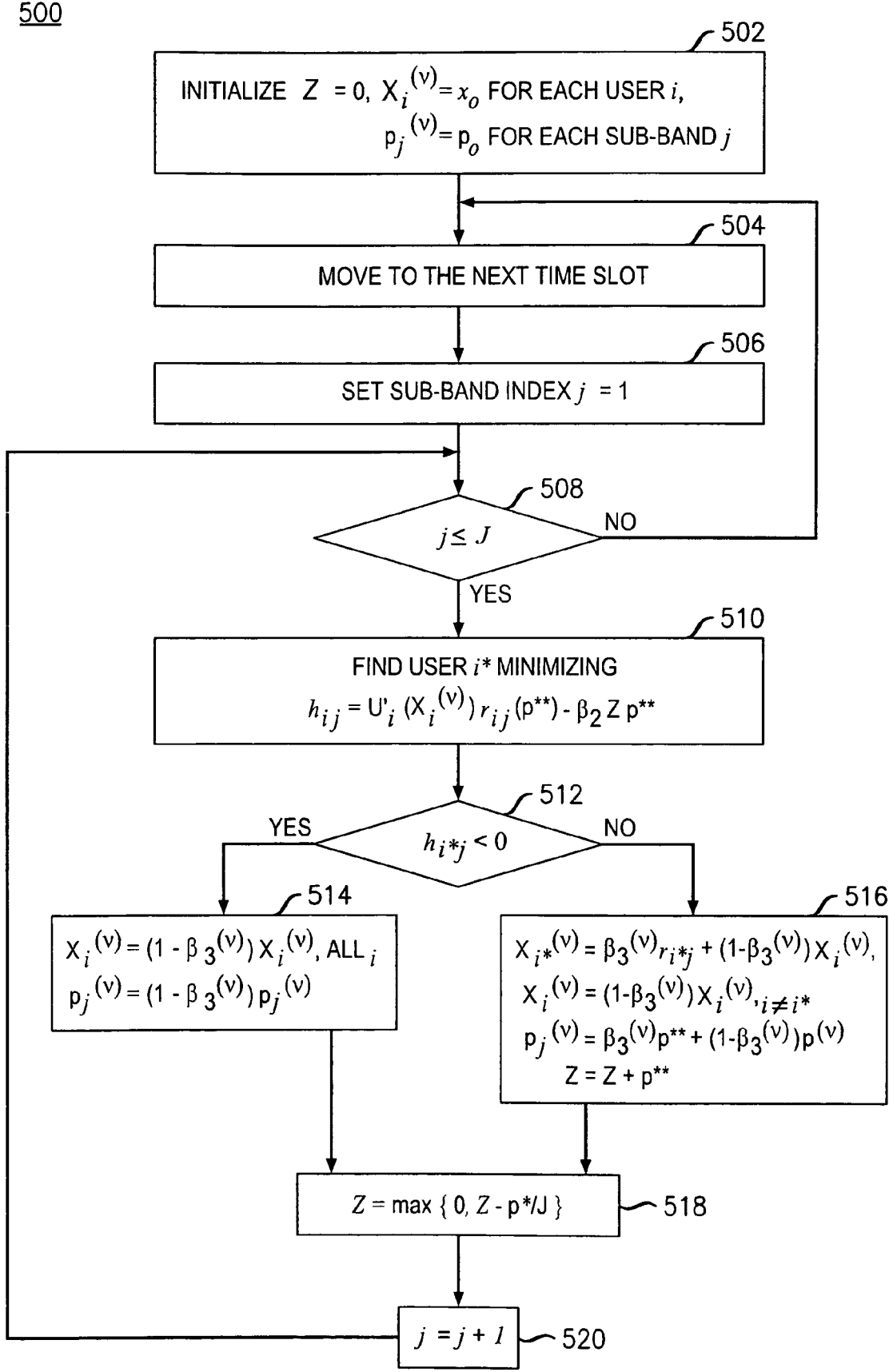
FIG. 5 is flow chart illustrating one embodiment of an algorithm for power allocations to sub-bands in best effort traffic flows.

FIG. 5 shows a flow chart for one example of the shadow algorithm 500. The shadow algorithm performs "virtual scheduling" of users within a reception area, e.g., a sector, for transmission so as to solve the problem of: $\max \Sigma_i U_i(X_i^{(v)})$, i.e., maximizing the utility for all users, where $U_i(X_i^{(v)})$ determines a "utility" of user i as a function of the average transmission data rate $X_i^{(v)}$ that is provided by the shadow algorithm to this user, subject to the constraint that the average total power used is at most $p^*$. (The superscript $^{(v)}$ is used to denote a virtual quantity assigned by the shadow algorithm.) $U_i$ is generally a concave, non-decreasing function of $X_i$.

A fixed parameter $p^{**} > p^*/J$ is provided, such that in any time slot and in any sub-band j, the allocated power can be either $p^{**}$ or 0. The assumption of the shadow algorithm is that at most one user can be scheduled in a given sub-band in any time slot.

The algorithm maintains a virtual ("ficticious") queue Z to keep track of the total power constraint, and also maintains and updates current values of a user's transmission data rate $X_i^{(v)}$ and current average power usage $p_j^{(v)}$ in each sub-band.

In block 502, parameters Z and $X_i^{(v)}$ are initialized, and an initial power allocation is made to each sub-band j according to $p_j^{(v)} = p_0$, where $p_0$ is an initial power value. For example, the initial state may be Z=0 and $X_i^{(v)} = x_0$ for all i, where $x_0 > 0$ and is a fixed constant. In one embodiment, $x_0$ is equal to 1.

In block 504, the time slot (or another selected time interval) for power allocation update is advanced to the next slot, and in block 506, a first sub-band j is selected by setting the index j to 1. In block 508, a comparison is made as to whether the sub-band index j is less than or equal to the total number of sub-bands J.

If the answer is "yes", then the method proceeds to block 510, which identifies a user i* that will satisfy an optimization objective for sub-band j in the current time slot. In this example, the objective is one of maximizing a term, $h_{ij}$, which is equal to $U'_i(X_i^{(v)}) r_{ij}(p^{}) - \beta_2^{(v)} Z p^{}$, where $U'_i$ is a derivative of $U_i$, and $r_{ij}(p^{})$ denotes an instantaneous transmission data rate within a timeslot that user i will get, if user i is scheduled for transmission in sub-band j with power $p^{}$, and with all sub-carriers (within this sub-band) allocated to the transmission. The instantaneous rate $r_{ij}(p^{})$ is estimated by the algorithm based on users' feedback, e.g., one or more CQIs received from users at certain predetermined time intervals. In another embodiment, the algorithm may be extended to the cell level by requiring that the $r_{ij}$ terms take into account only out-of-cell (not out-of-sector) interferences and obtaining power allocation for each sector and then jointly assigning users within a cell for all sectors. $U'_i(X_i^{(v)})$ represents the user's current marginal utility, i.e., the increase of user utility per unit increase of its average rate $X_i^{(v)}$. Then, the first term represents the increase in system utility if user i is to be served at the instantaneous data rate of $r_{ij}$ in the given timeslot. The product $\beta_2^{(v)} Z$ in the second term represents a current cost of power usage, and the second term $\beta_2^{(v)} Z p^{}$ represents the power cost to the system if power $p^{**}$ is allocated.

The small positive parameter, $\beta_2^{(v)}$, controls the tradeoff between responsiveness of the algorithm and its accuracy. The value of $\beta_2^{(v)}$ is set in advance, and not adjustable within the algorithm. For example, in one embodiment, $\beta_2^{(v)}$ is equal to 0.01, and $p^{**}$ is set equal to $1.5p^*$.

In block 512, a determination is made as to whether $h_{i*j}$ is less than zero or not. If the answer is "yes" (i.e., $h_{i*j}$ is negative), then block 514 sets the values for $X_i^{(v)}$ and $p_j^{(v)}$ according to: $X_i^{(v)} = (1-\beta_3^{(v)}) X_i^{(v)}$ for each user i, and $p_j^{(v)} = (1-\beta_3^{(v)}) p_j^{(v)}$. $\beta_3^{(v)}$) is another small positive parameter, controlling the tradeoff between responsiveness of the algorithm and its accuracy. In one embodiment, $\beta_3^{(v)}$ is equal to 0.001.

If the answer in block 512 is "no", the algorithm proceeds to block 516, in which the following power allocation $p_j^{(v)}$ and transmission rate allocations are made.

$$Z = Z + p^{**}$$

$$p_j^{(v)} = \beta_3^{(v)} p^{**} + (1-\beta_3^{(v)}) p_j^{(v)},$$

$$X_{i*}^{(v)} = \beta_3^{(v)} r_{i*j}(p^{**}) + (1-\beta_3^{(v)}) X_{i*}^{(v)} \text{ for the chosen user } i^*, \text{ and}$$

$$X_i^{(v)} = (1-\beta_3^{(v)}) X_i^{(v)} \text{ for all other users.}$$

That is, the average data rate for user i* is different from the data rates for other users.

In block 518, Z is updated according to $Z = \max\{Z - p^*/J, 0\}$, which means that Z is decremented by $p^*/J$, the maximum allowed average (across sub-bands) power usage per sub-band, but Z is not allowed to go below 0. In block 520, the sub-band index is increased by 1, and the algorithm repeats from block 508. The power allocation, $p_j^{(v)}$, generated by this scheduling algorithm is provided for use in the second algorithm related to actual scheduling.

Figure 6:
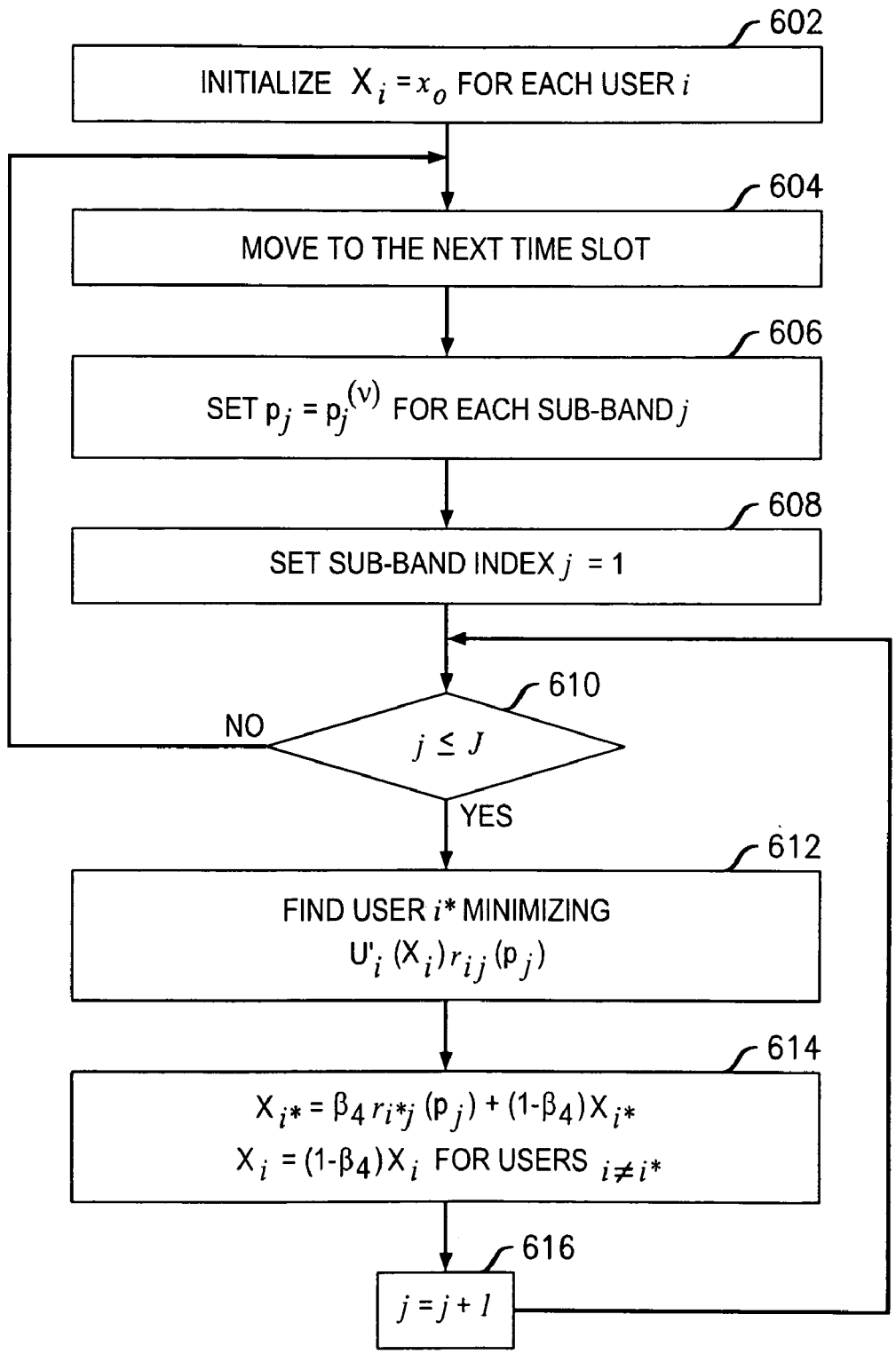
FIG. 6 is a flow chart illustrating one embodiment of another algorithm for use in conjunction with the algorithm of FIG. 5 for scheduling best effort traffic.

FIG. 6 shows a flow chart for one example of the actual scheduling algorithm 600. In block 602, the average transmission data rate $X_i$ is initialized for each user i. For example, the initial state may be: $X_i = x_0$ for all i, where $x_0$ is a fixed positive constant. In one embodiment, $x_0$ is equal to 1. In block 604, the time slot is advanced to the next slot. In block 606, the actual power $p_j = p_j^{(v)}$ is allocated to each sub-band j according to the values provided by the shadowing algorithm of FIG. 5.

The actual algorithm schedules one or more users in a given sub-band in each slot. The goal of the algorithm is to maximize the utility for all users, i.e., solve the problem: $\max \Sigma_i U_i(X_i)$, where $X_i$ is the average actual rate given to user i (by actual algorithm). For simplicity, FIG. 6 shows one embodiment of the actual algorithm that schedules at most only one user in a given sub-band in any slot. In general, however, one or more users may be assigned to each sub-band within each timeslot.

The sub-band index j is set to 1 in block 608. In block 610, a comparison is made as to whether the sub-band index j is less than or equal to the total number of sub-bands J. If the answer is "no", the algorithm proceeds to block 604 for processing of the next time slot. If the answer is "yes", then the method proceeds to block 612, which identifies a user i* that will satisfy a local optimization objective.

In this example, the objective is one of maximizing the term $U'_i(X_i) r_{ij}(p_j)$, which represents the utility of user i in sub-band j, with an instantaneous data rate $r_{ij}$. If the first user does not have enough bits to be sent, a second user can be scheduled in the same sub-band.

In block 614, the transmission data rate for user i* is set to $X_{i*}=\beta_4 r_{i*j}(p_j)+(1-\beta_4) X_{i*}$ for the chosen user i, and $X_i=(1-\beta_4)X_i$ for all other users. In block 616, the sub-band index is increased by 1, and the algorithm proceeds to block 610 to see if all sub-bands j have been processed. $\beta_4$ is another small positive parameter, controlling the tradeoff between responsiveness of the algorithm and its accuracy. In one embodiment, $\beta_4$ is equal to 0.005.

In another invention embodiment, the inventors provide an alternative algorithmic approach for creating efficient, soft fractional frequency reuse (FFR) patterns for enhancing performance of orthogonal frequency division multiple access (OFDMA) based cellular systems for forward link best effort (BE) traffic, in particular for cell edge users. That alternative methodology, characterized as a Multi-sector Gradient (MGR) algorithm, adjusts the transmit powers of the different sub-bands by systematically pursuing local maximization of the overall network utility. As will be described more fully below, the maximization can be done by sectors operating in a semi-autonomous way, with only limited gradient information exchanged periodically by neighboring sectors. The computations are still distributed and performed independently in each sector.

The MGR algorithm is addressed to power allocation (and reallocation) among the sub-bands by each sector, which is done on a relatively slow time scale. Given the power levels set by the algorithm, each sector can perform an opportunistic, channel-aware scheduling, taking advantage of the fast fading by proper assignment of users to sub-bands (on the fast time scale).

An important facet of MGR approach of the invention is the incorporation of an efficient "virtual scheduling" algorithm, which allows efficient real-time computation by each sector of the gradient of the system utility function with respect to the current sub-band transmit powers in the sector.

As in the previously described embodiments, sectors (or cells) are designated by k (k=1 to K) and sub-bands by j (j=1 to J), with each sub-band comprising c sub-carriers. The bandwidth of one sub-band is denoted by W and the noise spectral density by $N_0$. The utility of the system is defined as the sum of the sector utilities $$\left(U = \sum_k U^{(k)}\right).$$

The sector utility, $U^{(k)}=\Sigma_i U_i(X_i)$, where each $U_i$ is a smooth concave function of the average transmission rate, $X_i$, of user i served by sector k. Power allocated in sub-band j of sector k is denoted by $P_j^{(k)}$ and total power within each sector is upper-bounded by P*.

As also characterized in the previously described embodiments, channel quality indicator feedback is sent by the mobiles back to the base station for the purpose of resource allocation. The feedback is used by the channel aware scheduler to select users for each of the sub-carriers for transmission in each slot, and also to determine the transmission modulation format and channel code rate for the selected users. For this purpose, relatively frequent channel quality feedback is contemplated. In addition, relatively infrequent feedback indicating the level of interference experienced in each of the sub-bands is also utilized by the algorithm of this embodiment. Average signal-to-interference-and-noise ratio (SINR) for each sub-band is assumed to be fed back relatively infrequently (for example, once every 500 slots or ½ second was used by the inventors in their simulations) for this purpose. In addition, information corresponding to the path loss ratio between the signal and interfering base stations are fed back infrequently to the algorithm.

The MGR algorithm of the current embodiment operates to adjust the sub-band power levels $P_j^{(k)}$ over time (relatively slowly) with the purpose of improving the system utility, given a current set of the users in the system and their current sector assignments. The MGR methodology approximates a gradient ascend approach, and includes limited inter-sector (or inter-cell) information exchange.

As will be more fully described below, the MGR methodology invokes an interworking between two separate algorithms—a sub-band power adjustment algorithm and a virtual scheduling algorithm. In overall functional effect, the MGR algorithm operates at a sector level to dynamically allocate/reallocate the power levels among sub-bands. Among the sectors of the system, the MGR approach involves sectors (via base stations) exchanging information on how "costly" to their utility is the interference caused by other sectors.

The essential idea of the algorithm is simple. Each sector k constantly adjusts its power allocation to different sub-bands in a way that improves the total utility of the system. To further explain the detail of that process, the sub-band power adjustment algorithm is first considered.

MGR Algorithm

Each sector k maintains an estimate of the utility $U^{(k)}$ which the sector could potentially attain, given its current power allocation, $P_j^{(k)}$, among sub-bands and current interference level from other sectors. Moreover, sector k maintains estimates of partial derivatives $(D_j^{m,k}=\partial U^{(k)}/\partial P_j^{(l)})$ of its (maximum attainable) utility on the power levels $P_j^{(l)}$ in all sectors l (including self, l=k) and all sub-bands j (index "l" generally designating neighboring sectors). It is noted here that the computation of these estimates is handled by the virtual scheduling algorithm, which will be described in detail in conjunction with consideration of that algorithm below.

Sector k periodically sends values of the partial derivatives estimate, $D_j^{l,k}$, for all j, to each sector l≠k. Correspondingly, it also periodically receives the values of $D_j^{k,l}$, for all j, from each sector l≠k.

Sector k maintains the current values of $$D_j^k = \sum_m D_j^{k,l},$$

for each sub-band j

It should be clear that $D_j^k$ is the estimate of the partial derivative $\partial U/\partial P_j^{(k)}$.

For the power adjustment algorithm, a fixed parameter, Δ, is selected (Δ>0) representing a small incremental power change (increase of decrease) in a sub-band for a given update, and the current total power in the sector is denoted by $P^{(k)}=\Sigma_j P_j^{(k)}$. Using the estimates described above, the power adjustment algorithm then carries out the following operations in each physical time slot (or more generally, every $n_p$ physical slots) and in sector k.

Figure 7:
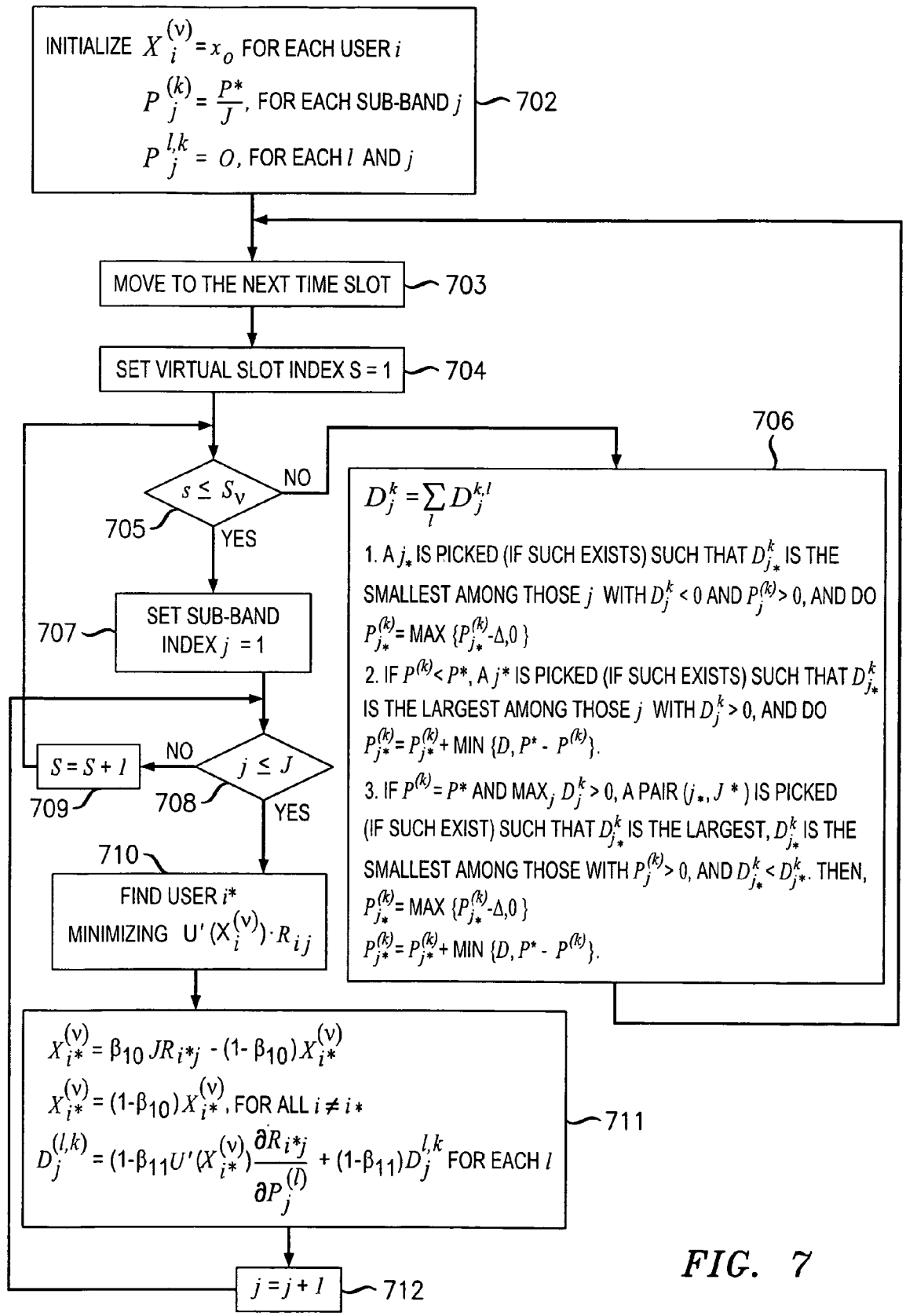
FIG. 7 is a flow chart illustrating another algorithm embodiment for use with best effort traffic.

Operation of the MGR algorithm (combined power adjustment and virtual scheduling parts) is illustrated in the flow chart of FIG. 7. It is to be noted that initial power allocation values may be set to $P_j^{(k)}=P*IJ$ (equal power allocation among all sub-bands). Note, however, that the algorithm runs "continuously", and, therefore, the choice of initial state—at the system start-up or reset—is not crucial.

The parameters of the algorithm are initialized as shown in Step 702 of the flow chart. Processing by the algorithm moves to the next time slot in Step 703 and the virtual slot index is set at 1 in Step 704. In the decision step 705, the algorithm checks to see if the virtual slot index is equal to a maximum slot index, $S_v$. If yes, the algorithm moves on to another processing phase beginning with Step 707 discussed below. If no, the algorithm moves to Step 706, and carries out the operations:

$$D_j^k = \sum_l D_j^{k,l}$$

1. A $j_*$ is picked (if such exists) such that $D_{j_*}^k$ is the smallest among those j with $D_j^k<0$ and $P_j^{(k)}>0$, and do $$P_{j_*}^{(k)}=\max\{P(P_{j_*}^{(k)}-\Delta,0\}$$

2. If $P^{(k)}<P^*$, a j* is picked (if such exists) such that $D_{j_*}^k$ is the largest among those j with $D_j^k>0$, and do $$P_{j_*}^{(k)}=P_{j_*}^{(k)}+\min\{\Delta,P^*-P^{(k)}\}.$$

3. If $P^{(k)}=P^*$ and $\max_j D_j^k>0$, a pair $(j_*,j^*)$ is picked (if such exist) such that $D_{j^*}^k$ is the largest, $D_{j_*}^k$ is the smallest among those with $P_j^{(k)}>0$, and $D_{j_*}^k<D_{j^*}^k$. Then, $$P_{j_*}^{(k)}=\max\{P_{j_*}^{(k)}-\Delta,0\};$$

$$P_{j^*}^{(k)}=P_{j^*}^{(k)}+\min\{\Delta,P^*-P^{(k)}\}:$$

as shown in the figure. Upon completion of those operations, the algorithm returns to Step 703.

Returning to the algorithm flow in the event of a "yes" decision in Step 705, at Step 707, the sub-band index is set to j=1. Then, at decision Step 708, the algorithm checks to see if the sub-band index is equal to the highest sub-band index. If "yes," the algorithm moves to Step 711, discussed below. If the decision in Step 708 is "no," the algorithm proceeds to Step 709 where the sub-band index is updated to the next higher index value. and then returns to Step 705.

Returning to the algorithm flow in the event of a "yes" decision in Step 708, at Step 711, the algorithm initiates a process for finding a user i for maximizing the utility: $U'(X_i^{(v)})R_{ij}$, and carries out the operations:

$$X_{i^*}^{(v)} = \beta_{10} J R_{i^*j} + (1-\beta_{10}) X_{i^*}^{(v)}$$

$$X_i^{(v)} = (1-\beta_{10}) X_i^{(v)}, \text{ for all } i \neq i^*$$

$$D_j^{(l,k)} = \beta_{11} U_i'(X_{i^*}^{(v)}) \frac{\partial R_{i^*j}}{\partial P_j^{(l)}} + (1+\beta_{11}) D_j^{l,k} \text{ for each } l$$

as indicated in the figure.

Finally, in Step 712, the sector index is updated to the next higher sector index and processing returns to Step 708.

It is noted that the MGR algorithm works with the estimated maximal possible utility a sector can potentially attain (given current power levels), and not the actual current utility. If power allocations in the system converge, and stay approximately constant, then the "virtual utilities," run in the sectors by these algorithms, will be close to actual ones. However, the system is very dynamic, with users arriving, departing, and moving from sector to sector. As a result, the actual sector utilities can "lag behind" the optimal ones for the current power levels. Virtual utilities estimate the optimal utilities, and thus better determine the desired directions of power adjustments.

The inventors have determined that the sensitivity of a sector k utility to changes in power levels $P_j^{(l)}$ (in all sectors l and sub-bands j), is "typically" given by the partial derivative expression:

$$D_j^{(l,k)} = \sum_i U_i'(X_i^{(v)}) \phi_{ij} \frac{\partial R_{ij}}{\partial P_j^{(l)}}$$

where $X_i$ is the average rate for user i, $R_{ij}$ is the transmission rate in sub-band j for user i, and $\phi_{ij}$ represents the fraction of time a scheduling algorithm chooses user i for transmission in sub-band j. (The derivation of that expression is not useful to an understanding of the methodology of the invention, and it has been omitted in the interest of clarity of presentation. Nonetheless, a reader wishing to pursue that derivation will find it in Section V of a paper authored by the inventors and made a part of the provisional application referenced above and incorporated herein by reference.) The inventors have also determined that the values of the partial derivatives $\partial R_{ij}/\partial P_j^{(l)}$ are readily available to the sector k controller.

There are, however, no known methods for the controller to compute or estimate the optimal values of the fractions $\phi_{ij}$, maximizing the sector utility $U^{(k)}$.

According to the method of the invention, an estimate and update of the values of partial derivatives $D_j^{(l,k)}$, for all l and j "simultaneously," is determined as follows. Each sector k continuously runs a virtual scheduling algorithm which operates to maximize the sector utility.

It is further to be noted that the MGR algorithm is run by each sector k independently, over a sequence of "virtual time slots." (The algorithm runs a fixed number $n_v$ of virtual slots within each physical time slot of the system. The greater the $n_v$, the greater the accuracy of the algorithm and its responsiveness to changes in system state; but, the computational burden is greater as well.) The algorithm maintains the current values $X_i$ of average user (virtual) throughputs, and current values of $D_j^{(l,k)}$. It uses small averaging parameters $\beta_{10}$; $\beta_{11}>0$, which are chosen in conjunction with $n_v$. As a general rule, as $n_v$ changes, the product $\beta_j n_v$ has to be kept constant.

It should be noted, as will be understood by a person skilled in the art, that instead of the partial derivative $U'_i(X_i^{(v)})$, one can use a more general notion/expression of sensitivity of user utility to the rate a user receives.

As previously indicated, the virtual scheduling components of the MGR algorithm require the estimation of the sub-band rates $R_{ij}$, which are the rates available to user i in sub-band j of sector k, given the current power-to-sub-band allocation in the system, and scheduling of the user. Estimates of the rates $R_{ij}$ are computed by the sector base station as a function of average pilot SINRs fed back to the base station by the users. In addition, the users will also feedback the ratios of the path gains from the serving sector to interfering sectors for a set of strongest interfering sectors, which ratios are used for the gradient computation carried out by the virtual scheduling algorithm.

The inventors have determined, through extensive simulations, that the MGR algorithm can improve the cell edge data throughputs significantly, by up to 66% in some cases, over the standard methodology of the art, while maintaining the overall sector throughput at the same level as that achieved by the traditional approach. The simulations have also shown that this algorithm leads the system to "self-organize" into efficient, soft frequency reuse patterns with no a priori frequency planning.

As illustrated herein, embodiments of the present invention provide a method of dynamic resource allocations that adapts to changes in system layout or user distribution such that fractional frequency reuse can be efficiently implemented to avoid or minimize interference between neighboring sectors. Unlike conventional methods, the present method does not require any a priori resource planning such as frequency or timeslot planning. Instead, frequency band assignments are done dynamically and in real-time. Furthermore, each base station performs resource allocations largely independently of other base stations, e.g., requires no or minimal direct signaling exchange with other base stations, and resource allocations are determined based at least in part on one local optimization objective (for the reception area, e.g., cell or sector, that it services) and a channel quality indicator or feedback from one or more users or mobile units. Based on the channel quality indicators received from one or more users in the reception area, estimates of relevant parameters can be arrived at for use in algorithms for resource allocations.

While the foregoing is directed to embodiments of the present invention, other and further embodiments of the invention may be devised without departing from the basic scope thereof, and the scope thereof is determined by the claims that follow.

The invention claimed is:

1. A method of managing sub-band resources in a wireless network including a plurality of base stations each corresponding to one or more reception areas, the method comprising:
adaptively allocating, at each of the plurality of base stations, one or more sub-band resources to one or more mobile devices in corresponding reception areas based on indications of one or more power adjustments received from the one or more mobile devices, wherein adaptively allocating includes:
determining whether a sub-band resource index corresponds to a maximum slot index;
determining whether the sub-band resource index corresponds to a first maximum value when the sub-band resource index corresponds to the maximum slot index;
determining a mobile device of the one or more mobile devices for maximizing current usage of a utility of a base station of the plurality of base stations based on the first maximum value; and
determining a second maximum value based on the current usage of the utility of the base station.

2. The method of claim 1, further comprising:
estimating a sub-band resource rate, wherein the sub-band resource rate is available to the one or more mobile device users.

3. The method of claim 2, wherein estimating further comprises:
computing by a base station an estimate of the sub-band resource rate as a function of an average pilot signal-to-interference-and-noise ratios.

4. The method of claim 1 wherein the plurality of base stations comprise sectors, and wherein each of the sectors maintains a maximum attainable utility of power levels for one or more sub-band resources.

* * * * *